(12) United States Patent
Satsangi et al.

(10) Patent No.: US 12,730,491 B2
(45) Date of Patent: Sep. 8, 2026

(54) TRANSITIONS BETWEEN LOW POWER MODES IN A PROCESSING SYSTEM

(71) Applicant: NXP USA, Inc., Austin, TX (US)

(72) Inventors: Mohit Satsangi, New Delhi (IN); Loic Hureau, Toulouse (FR); Thomas Henry Luedeke, Oberbergkirchen (DE); Ray Charles Marshall, Herts (GB); Shreya Singh, Ranchi (IN)

(73) Assignee: NXP USA, Inc., Austin, TX (US)

( * ) Notice: Subject to any disclaimer, the term of this patent is extended or adjusted under 35 U.S.C. 154(b) by 154 days.

(21) Appl. No.: 18/423,421

(22) Filed: Jan. 26, 2024

(65) Prior Publication Data

US 2024/0411354 A1 Dec. 12, 2024

(30) Foreign Application Priority Data

Jun. 8, 2023 (IN) ............................ 202311039341

(51) Int. Cl.
*G06F 1/3209* (2019.01)
*G06F 1/3287* (2019.01)
*G06F 1/3296* (2019.01)

(52) U.S. Cl.
CPC .......... *G06F 1/3209* (2013.01); *G06F 1/3296* (2013.01)

(58) Field of Classification Search
CPC ..... G06F 1/3206; G06F 1/3209; G06F 1/3203
See application file for complete search history.

(56) References Cited

U.S. PATENT DOCUMENTS 10,795,425 B2 10/2020 Hanson et al.
2006/0265617 A1* 11/2006 Priborsky ............ G06F 1/3203 713/320
2015/0095670 A1* 4/2015 Reddy .................. G06F 1/3243 713/320
2018/0004278 A1* 1/2018 Lim ...................... G06F 1/3287
2019/0278363 A1* 9/2019 Rowley .................. G11C 16/26
2020/0371581 A1* 11/2020 Hureau ................. G06F 1/3206
2022/0132428 A1* 4/2022 Hu ....................... H04L 67/104

FOREIGN PATENT DOCUMENTS

KR 102313098 B1 10/2021

* cited by examiner

*Primary Examiner* — Jaweed A Abbaszadeh
*Assistant Examiner* — Gayathri Sampath
(74) *Attorney, Agent, or Firm* — Joanna G. Geld

(57) ABSTRACT

Processing circuitry includes a selectively powered domain having a communications interface to communicate with power management circuitry via a bus in accordance with a bus protocol, and a processing core to control the communications interface, wherein the selectively powered domain is not powered when the processing circuitry is operating in any one of multiple low power modes. The processing circuitry also includes an always on power domain having a set of pins to communicate a set of handshake signals with the power management circuitry and a power management sequencer to control power mode transitions of the processing circuitry. When the processing circuitry is operating in one of the multiple low power modes such that the communications interface and the processing core are not powered, the power management sequencer generates a signature on the set of handshake signals to control power mode transitions from one of the multiple low power modes.

17 Claims, 5 Drawing Sheets

TRANSITIONS BETWEEN LOW POWER MODES IN A PROCESSING SYSTEM

CROSS-REFERENCE TO RELATED APPLICATIONS

This application claims the priority under 35 U.S.C. § 119 of India application No. 202311039341, filed on 8 Jun. 2023, the contents of which are incorporated by reference herein.

FIELD

This disclosure relates generally to processing systems, more specifically, to transitions between low power modes in a processing system, in which the processing system may have power management circuitry and processing circuitry.

RELATED ART

A processor or processing unit, such as a microprocessor, microcontroller, system on chip or any other processing configuration, may be used to process any type of data or information to control certain parameters, functions or operations associated with a particular application. Automotive applications may include, for example, gateways (e.g., in-vehicle networking and telematics), advanced driver assistance systems (ADAS), infotainment (audio and/or video entertainment, information, navigation, hands-free control, etc.), clusters (digital instrumentation, heads-up display, etc.), vehicle to everything (V2X) (e.g., communication between a vehicle and external entities, traffic sign recognition, etc.), radar, vision (e.g., cameras, proximity sensors, collision avoidance, blind spot monitoring, etc.). Industrial applications may include, for example, industrial tablets or laptops and the like, internet protocol television (IPTV), industrial control, medical monitoring, home automation and/or alarm systems, etc.

A processor may have multiple low power modes, such as a standby mode or the like, to minimize power consumption during periods of inactivity in which all but a minimum amount of logic is powered down. An external Power Management Integrated Circuit (PMIC) may be used to provide supply voltage to the processor, and may further be used to control the power mode of the processor including transitioning between normal and low power modes. Processors today are increasingly low power aware with increased granularity of the power modes. While higher power modes have the ability to communicate with an external PMIC via a standard communications interface (e.g. I2C, SPI, etc.), it is not possible to do so when such interfaces and the corresponding cores are not available on either the processor side or the PMIC side due to reduced power modes. Therefore, a need exists for improved transitions between power states, including between a low power state and an even lower power state, when portions of the processor, the PMIC, or both may be unavailable.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In a processing system with granulated power modes, the processor may include multiple power islands (i.e. power domains) which need to be switched on or off in order to achieve an optimal energy consumption profile for each power mode. Also, components on the board which include the processing system can be turned off as more functionality gets turned off to save more system power. However, in order to properly implement the granulated power modes, a core within the processor and a communications interface are required to communicate with the PMIC to control the power supplies to the processor (e.g. to power domains of the processor) or to board components. While in the lowest power modes, though, such a core within the processor or the communications interface may not be on (may not be powered up).

In current systems, the processor and the communications interface needs to be woken up. Similarly, on the PMIC side, the communications infrastructure, including high-frequency clocks, needs to be powered up as well. This results in increased total energy consumption and latency. For example, such current systems may include battery operated systems that spend long periods of time in low-power modes in order to prevent battery depletion. Needing to power up the processor, communications interface, and the PMIC in order to transition between low power modes is undesirable as it negatively affects battery life.

In one embodiment described herein, though, transitions between low power modes are implemented using autonomous hardware to signal to the PMIC, but without requiring the full communications interface with the PMIC. For example, the PMIC can be signaled over existing sideband signals (e.g. by re-using pins of the processor and PMIC) without fully powering the communications interface. This can be done by indicating power mode transitions to the PMIC via a signature or pattern of pulses by way of existing handshake signal lines between the processor and PMIC. This type of signaling mechanism does not rely on implementing the protocol of the communication bus between the processor and PMIC (such as an I2C or SPI bus) and thus requires a small energy footprint as compared to fully implementing the interface, and, since the full interface is not implemented, there is no need to wake the processor, allowing for faster mode transitions. Also, on the PMIC side, there is no need to enable a high frequency clock which also reduces power consumption.

Figure 1:
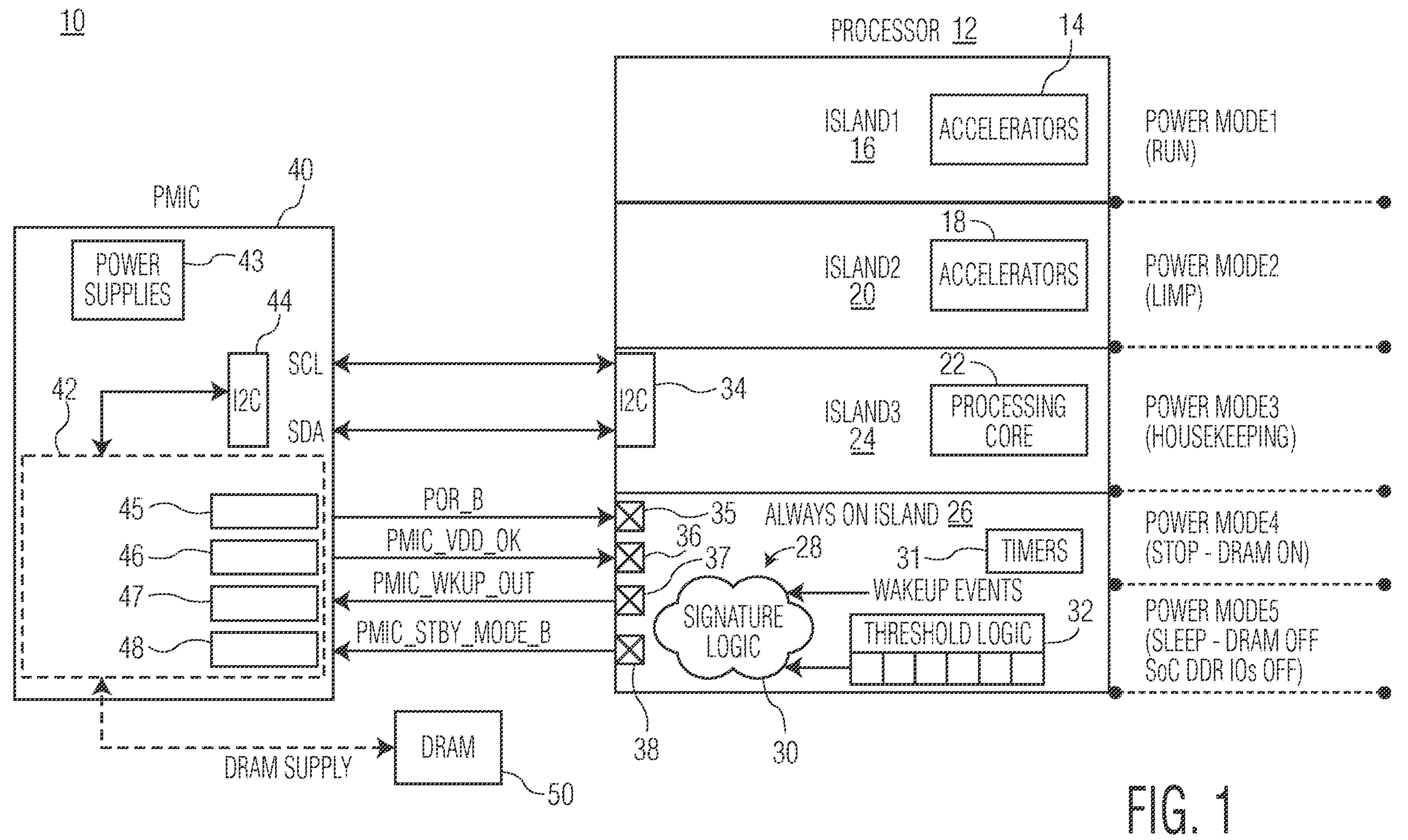
FIG. 1 illustrates, in block diagram form, a processing system having a power management integrated circuit (PMIC) and a processor, in accordance with one embodiment of the present invention.

FIG. 1 is a simplified block diagram of a processing system 10 implemented according to one embodiment of the present invention. Processing system 10 may be implemented in a discrete manner or may be integrated onto a single module, such as a system on chip (SoC) or the like. Processing system 10 includes a power management IC (PMIC) 40, a processor 12 (also referred to as an application processor), and a memory 50. PMIC 40 cooperates with processor 12 to ensure that power mode transitions of processor 12 (and transitions of any other devices powered by PMIC 40) take place in a robust and secure manner to reduce potential of failure as further described herein. Processor 12 may include any type of processing circuitry, device, or system, such as, for example, a programmable integrated circuit (IC), a microprocessor, a microcontroller (MCU), a central processing unit (CPU), an application processor, etc., and may include multiple processing devices. In the illustrated embodiment, processor 12 is partitioned into power domains, which can be referred to as islands. Processor 12 includes an ISLAND1 16, ISLAND2 20, ISLAND3 24, and an always ON island 26. Any of the islands, other than always ON island 26 can be powered down, when needed, based on the power modes of processor 12 (and these islands may be referred to as selectively powered islands or selectively powered domains). In one embodiment, the islands are powered down in a particular sequence. Always ON island 26 is never powered down, regardless of the power mode of processor 12.

In one embodiment, processor 12 includes five power modes: mode 1 (RUN mode), mode 2 (LIMP mode), mode 3 (HOUSEKEEPING mode), mode 4 (STOP mode), and power mode 5 (SLEEP mode). For RUN mode, all of the islands are powered up (e.g. islands 16, 20, 24, and 26). For LIMP mode, which is a low power mode as compared to the RUN mode, islands 20, 24, and 26 are powered up, but not island 16. This results in lower power operation as compared to the RUN mode in which all islands are powered up. For HOUSEKEEPING mode, which is a lower power mode as compared to the LIMP low power mode, fewer islands are powered up (e.g. only islands 24 and 26 are powered up, while islands 16 and 20 are powered down). For both STOP and SLEEP modes, which are both low power modes (both lower power modes as compared to HOUSEKEEPING mode), only always ON island 26 is powered up and no other islands are powered. (In STOP mode, a memory outside of processor 12, such as memory 50, may still be powered, but in SLEEP mode, the memory is off as well.) This results in the lowest power consumption for processor 12 (in which SLEEP mode has the lowest power consumption). As illustrated in the embodiment of FIG. 1, each higher level power mode, increasing in power from the STOP and SLEEP modes, includes one or more additional islands which are powered up, in which each can be powered by a corresponding regulator in PMIC 40. Processor 12 can therefore indicate the desired power mode to PMIC 40 which then controls the transitions between the modes and the supply voltages provided to the islands of processor 12 in accordance with the desired power mode.

Each of the islands of processor 12 can include any type of circuitry which can be used during the corresponding power modes. For example, island 16 includes accelerators 14, island 20 includes accelerators 18, island 24 includes a processing core 22 as well as a communications interface 34 (which connects to PMIC 40 via an I2C bus and thus implements the I2C communication protocol). Alternatively, interface 34 can implement any communication protocol (i.e. bus protocol) between processor 12 and PMIC 40. As will be described in more detail below, always ON island 26 includes circuitry that is never powered down, such as timers 31 (which may include, e.g., a periodic wakeup timer and a stop-to-sleep trigger timer), threshold logic (i.e. circuitry) 32 coupled to timers 31, and signature logic 30 configured to receive indications of internal or external wakeup events and inputs from threshold logic 32. Always ON island 26 also includes input/output (I/O) pins 35-38 which are used to communicate handshake signals with PMIC 40 and are always available for use since they are located in always ON island 26. However, note that to communicate with PMIC 40 via communications interface 34 using the I2C communication protocol (or any communication protocol of the bus connecting processor 12 and PMIC 40), processor 12 has to be at least in HOUSEKEEPING mode in which island 24 is powered up such that interface 34 and processing core 22 are powered up to implement the communication. (Similarly, as will be described below, PMIC 40 needs to be in a sufficiently high power mode such that interface 44 is also available.)

Note that communications interface 34 is available in HOUSEKEEPING, LIMP, and RUN modes, but not in STOP or SLEEP modes. This means that in STOP or SLEEP modes, processor 12 cannot communicate with PMIC 40 via communications interface 34. Therefore, transitions between lower power modes such as STOP and SLEEP modes which require communication via communications interface 34 require transitioning to at least HOUSEKEEPING mode, in which processing core 22 is available (powered up) and capable of communicating via communications interface 34. However, as will be described in further detail below, in one embodiment, transitions between lower power modes such as STOP and SLEEP modes can be controlled using pulse signaling on existing handshake pins 35-38, which are available during these modes but do not implement the bus protocol between processor 12 and PMIC 40).

In one embodiment, processor 12 is a safety application processor. Memory 50 may include one or more of any type of memory or storage devices or any combination thereof, including, for example, random access memory (RAM), dynamic RAM (DRAM), synchronous DRAM (SDRAM), non-volatile (NV) memory such as NVRAM, Flash memory, solid state drives (SSDs), hard disk drives, optical drives, or any other suitable form of internal or external storage. The memory may be incorporated in processing system 10, or instead, some or all of memory 50 may be configured as interfaces to external memory or drives or the like. In alternate embodiments, processing system 10 may include other external devices, in place of or in addition to memory, which are also linked to the power modes of processor 12.

Processing system 10 may be used to implement or may be part of an automotive application or an industrial application or the like in which safety and robustness are of concern. Processing system 10, although not illustrated, may include any number of peripheral interfaces which may be used to interface sensors, communication devices, detectors, display devices, keyboards, controllers, mice, etc., to enable processor 10 to process any type of data or information to control certain parameters, functions or operations associated with the particular application. In many such applications, processor 10 operates in low power modes to reduce power consumption in which a reduced amount of logic and circuitry remains powered sufficient for the application. PMIC 40 controls the supply voltage provided to the islands of processor 10 (and any other peripherals) and further facilitates transitioning processor 10 between its normal and low power modes as further described herein.

PMIC 40 also has a low power mode, referred to herein as a standby mode, in which it maintains a very low yet sufficient level of operation to detect requests by processor 12 to reawaken the system. PMIC 40 may execute, for example, a power management state machine, located in a main domain of PMIC 40, to control power mode transitions of system 10 and to control power supplies 43 to provide the appropriate supplies to processor 12 (and to any other elements of system 10, as needed). PMIC includes a communications interface 44 in the main power domain, similar to communications interface 34, which is used to communicate with processor 12 via the bus connected between communications interfaces 34 and 44 according to a corresponding bus protocol such as I2C. The main domain is powered down during standby mode of PMIC 40, thus, during standby mode, communications interface 44 is not available for use. PMIC 40 includes an always ON domain 42, which includes I/O pins 45-48, which are configured to communicate with pins 35-38 of processor 12, respectively. When not in standby mode, these pins communicate handshake signals for communications via interfaces 44 and 34 in accordance with the bus protocol. In one embodiment, each of these handshake signals is a one-bit signal. During standby mode, pins 45-48 and the handshake signals can be repurposed to indicate switching power supplies ON or OFF in the lowest power modes (such as SLEEP and STOP modes of processor 12) in which communications interface 44 is not available. Note that the handshake signals are located outside the bus between the communications interfaces, and thus may also be referred to as sideband signals. In one embodiment, such as when processor 12 implements a safety application processor, domain 42 may correspond to a safety domain 42 which also implements safety functions (such as by implementing a safety state machine).

Figure 2:
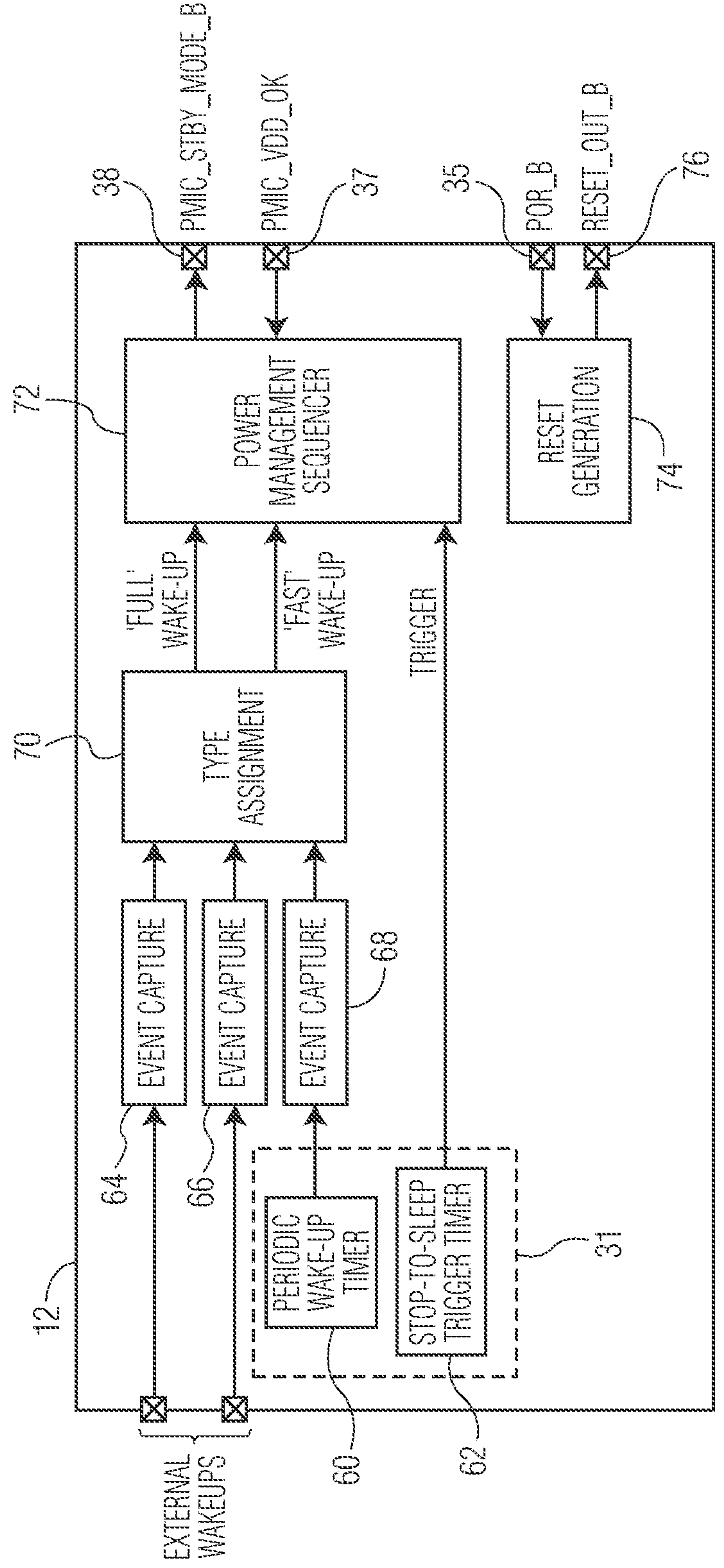
FIG. 2 illustrates, in block diagram form, power mode control circuitry in an always-on domain of the processor of FIG. 1, in accordance with one embodiment of the present invention.

FIG. 2 illustrates in block diagram form, a portion of processor 12 which includes circuitry located in always ON island 26, used to manage transitions between power modes. For example, event capture circuits 64, 66, and 68 can be coupled to receive wakeup events, in which event capture circuits 64 and 66 receive external wakeup events and event capture circuit 68 receives an internal wakeup event from a periodic wakeup timer 60. Type assignment circuit 70 is coupled to receive the captured wakeup events and determines the type of wakeup indicated (e.g. a "full" or "fast" wakeup), and provides the appropriate "full" or "fast" wakeup signal to a power management sequencer 72. (Note that alternate embodiments may include additional or different wakeup types.) A stop-to-sleep trigger timer 62 provides a stop-to-sleep trigger signal to power management sequencer 70, which, based on the wakeup signals and trigger signal, communicates via pins 37 and 38 with PMIC 40. Note that timers 60 and 62 may be two of the timers in timers 31. Sequencer 72 is coupled to pin 38 to provide PMIC_STBY_MODE_B to pin 48 of PMIC 40, and to pin 37 to receive PMIC_VDD_OK from pin 47 of PMIC 40. The PMIC_STBY_MODE_B signal, when operating in "normal mode" (i.e. in at least the HOUSEKEEPING mode in accordance with the communication protocol of interface 34) is a signal which, when asserted to a logic level low, provides a request to PMIC 40 to enter standby mode. PMIC_VDD_OK, when operating in normal mode, is a signal which, when asserted, indicates to processor 12 that that the power supplies are set at the desired levels. As used herein, normal mode refers to being in a non-low power mode, i.e. any power mode in which communications interfaces 34 and 44 are powered and thus available to communicate in accordance with the corresponding communication protocol (i.e. bus protocol). Any power mode in which communication between communications interfaces 34 and 44 is not available is not considered to be normal mode or a non-low power mode.

Still referring to FIG. 2, a reset generation circuit 74 is coupled to pin 35 to receive a power on reset signal, POR_B, from PMIC 40 and to a pin 76 to provide RESET_OUT_B to elements of system 10, as needed. When POR_B is asserted to a logic level low, a power-on-reset is indicated, and when POR_B is released (to a logic level high), a reset is no longer indicated (e.g. reset has completed). In one embodiment, circuits 64, 66, 68, 70, and 72 may be considered part of signature logic 30 of FIG. 1. Processor 12 can be woken up from the low power mode due to external wakeup events (e.g. upon a change in a pin's log state) or due to an on-chip wakeup event (i.e. internal wakeup event) generated by on-chip circuitry of processor 12 (e.g. periodic wakeup timer 60). The external wakeup events occur external to processor 12 or external to processing system 10, while the on-chip wakeup events are events which occur within processor 12. Note that signals ending with "B" indicate active low signals which are asserted at a logic level low (i.e. zero), and negated at a logic level high (i.e. one). However, any signal described herein can be implemented as an active high signal (which is asserted to a logic level high and negated to a logic level low) or an active low signal.

Figure 3:
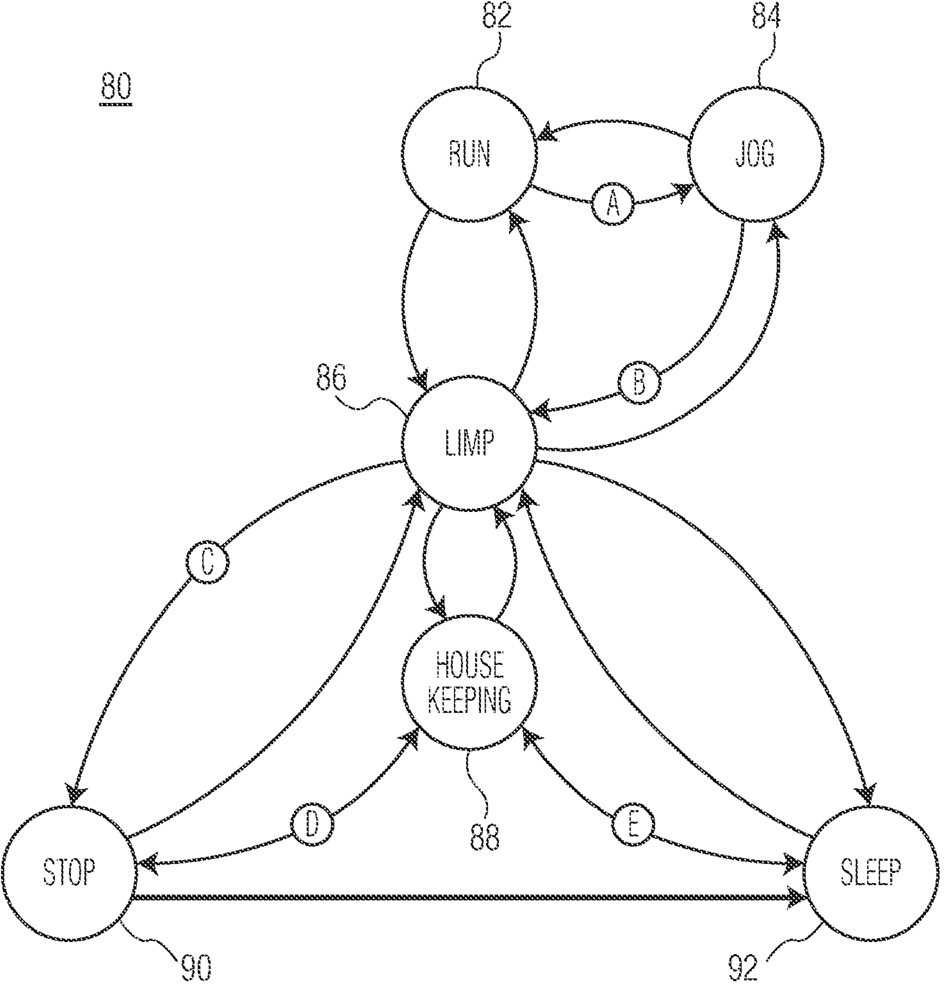
FIG. 3 illustrates a simplified block diagram of power mode transitions of the processing system of FIG. 1, in accordance with one embodiment of the present invention.

FIG. 3 illustrates a power mode state machine 80 for processor 12, including a state 82 (corresponding to the RUN mode), a state 84 (corresponding to a JOG mode), a state 86 (corresponding to the LIMP mode), a state 88 (corresponding to the HOUSEKEEPING mode), a state 90 (corresponding to the STOP mode), and a state 92 (corresponding to the SLEEP mode). In one embodiment, the JOG mode may be powered the same way as the RUN mode, or alternatively, may correspond to a lower power mode than the RUN mode, but higher than the LIMP mode. Note that the power modes of processor 12 also reflect the power modes of system 10 as a whole. In the illustrated embodiment, the transitions labeled as A, B, C, D, and E show how processor 12 may gradually transition through decreasing power modes from full power (e.g. the RUN power mode) to the lowest power state (e.g. to the SLEEP power mode). Power mode state machine 80 will be described with respect to an automotive application, but the concepts apply to any application.

The RUN mode may correspond to when the car is fully powered and running (in which all islands are powered up). The JOG mode may correspond to a lower power mode than the RUN mode in which the vehicle engines are off, and a limited subset of real time applications, cores, and peripherals could be operating. The LIMP mode may correspond to the car being parked a longer time, such as overnight. In this case, the car may be plugged in for charging. The car can transition from LIMP mode to JOG mode and from JOG mode to RUN mode, or may transition from LIMP mode directly to RUN mode based on the signaling received by the state machine. The HOUSEKEEPING mode is a lower power mode, lower than the LIMP mode, which may correspond to periodic wakeups used to handle small tasks, such as management of timers. In HOUSEKEEPING mode, note that island 24, including communications interface 34 and processing core 22, is powered, thus allowing for full communications according to the protocol of the bus connecting communications interfaces 34 and 44.

The STOP mode may correspond to the car not being in use for a few days, in which only the always ON island is powered up. The SLEEP mode may correspond to an even longer period of non-use, such as not being in use for weeks. In this mode, even more elements of system 10 may be powered down. In one embodiment, the transition from either STOP mode or SLEEP mode to LIMP mode may occur for a full wakeup, while the transition from either the STOP mode or SLEEP mode to HOUSEKEEPING mode may first occur for a fast wakeup. That is, the HOUSEKEEPING mode may be referred to as an intermediate power state used in transitions from the lowest power modes (STOP or SLEEP) to LIMP mode, considered a full wakeup power state. In one embodiment, upon a fast wakeup to the HOUSEKEEPING mode, the state machine can again transition back to one of the lower power modes rather than continuing transitioning to the LIMP mode.

It may be desirable to transition from the STOP mode directly to the SLEEP mode, such as after a period of time that the car is not in use. In current systems, though, this transition is not possible without transitioning first to at least the HOUSEKEEPING mode which powers up island 24 to allow for processor core 22 and communications interface 34 to operate, and similarly, in this mode, communications interface 44 of PMIC 40 also needs to be powered up. However, this is not desirable in the situation when transitioning from a low power mode to an even lower power mode. Therefore, in one embodiment, state machine 80 further includes a direct transition from STOP (state 90) to SLEEP (state 92). This prevents the need for increased power consumption when making this transition since the HOUSELEEPING state need not be traversed. However, since only always ON island 26 is powered up, the transition from STOP to SLEEP cannot use communications interfaces 34 and 44 to communicate between processor 12 and PMIC 40.

Therefore, in one embodiment, referring to FIG. 1, timers 31 can be initiated, as needed, when transitioning to a lower power mode, in which the timers or timers 31 can be implemented with one or more real time clocks or any other low power clocks. Threshold logic 32 of FIG. 1 can include one or more programmable thresholds to compare with the count values of timers 31, and upon achieving a particular predetermined time threshold or receiving a particular wakeup event, signature logic 30 can generate and send a signature to PMIC 40. The signature can include, for example, one or more pulses based on the real time clock or lowpower clock. In one embodiment, this signature can be sent from pin 38 by way of the existing PMIC_STBY_MODE_B signal line. In this case, the signature sent on this signal line communicates different information to PMIC 40 than PMIC_STBY_MODE_B does during normal operation. That is, the period or nature of the signature signal sent on this existing line differs from the regular signal provided during normal operation (when communications interface 34 is available to implement the corresponding communication protocol, as described above). PMIC 40 may include a small amount of logic within its always ON domain 42 which can recognize one or more signatures received via this existing line at pin 48 and decode the signatures to determine which supply or supplies need to be switched ON or OFF. In this manner, this signature can be sent via this existing line from pin 38 to pin 48 without requiring the communication infrastructure available in HOUSEKEEPING mode, and without a powered-up core.

Referring to stop-to-sleep timer 62 as an example, this timer can be implemented with a real time clock or any other low power clock which is initiated to start operation (e.g. to start incrementing or decrementing, depending on the configuration of the timer) upon transitioning to STOP mode. Threshold logic 32 of FIG. 1 can include a comparator and a programmable threshold to compare with the count value of timer 62 to generate the stop-to-sleep trigger signal. Signature logic 30, based on this stop-to-sleep trigger signal, can generate and send a signature to PMIC 40. For example, as illustrated in FIGS. 2 and 3, upon entering STOP mode 90, stop-to-sleep timer 62 can be initiated to start incrementing or decrementing and when a predetermine threshold is reached, can assert the trigger signal provided to power management sequencer 72. Power management sequencer 70 can use pin 38 to provide a signature on the PMIC_STBY_MODE_B signal line to PMIC 40 (via pin 48).

Still referring to FIGS. 2 and 3, based on external wakeups captured by event capture circuits 64 and 66 and on the internal wakeups from periodic wakeup timer 60 captured by event capture circuit 68, type assignment circuit 70 can determine what type of wakeup is indicated (e.g. a full wakeup or fast wakeup). Power management sequencer 72, in addition to the trigger from stop-to-sleep trigger timer 62, receives the full and fast wakeup signals from type assignment circuit 70. Based on the received wakeup signals and triggers, which result in different transitions of state machine 80, power management sequencer 72 can generate an appropriate signature on PMIC_STBY_MODE_B signal line to PMIC 40 and interpret a signature or response from PMIC 40 on PMIC_VDD_OK signal line. Similarly, based on reset events generated by reset generation circuit 74, reset generation circuit 74 can send an appropriate signature on the RESET_OUT_B line to PMIC 40 and interpret a signature or response from PMIC 40 on POR_B signal line.

Figure 4:
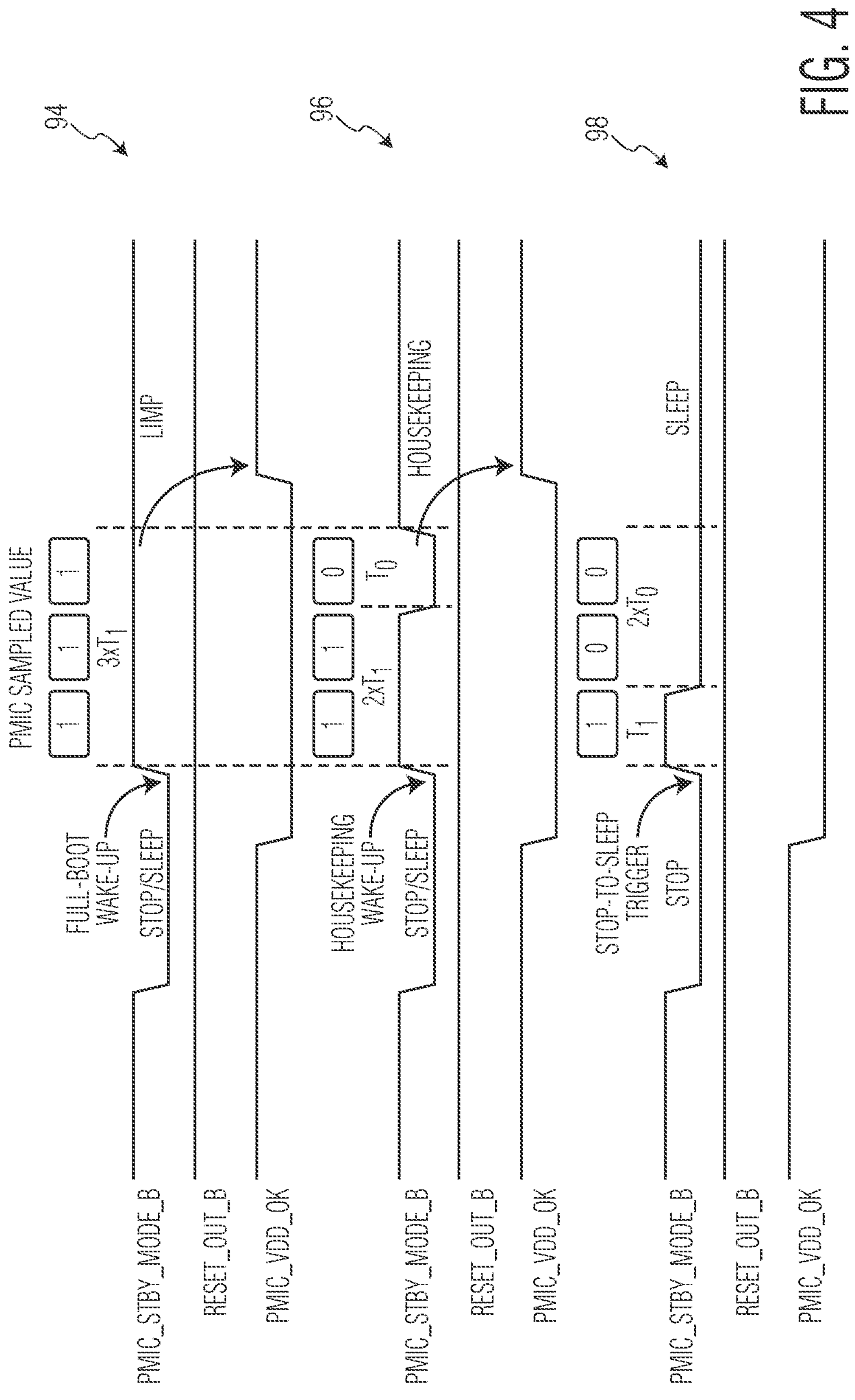
FIG. 4 illustrates example waveforms of various signals communicated between the PMIC and the processor for power mode transitions, in accordance with one embodiment of the present invention.

FIG. 4 illustrates example sets of waveforms 94, 96, and 98, of various signals communicated between the PMIC and the processor for power mode transitions of state machine 80. Each of waveforms 94, 96, and 98 corresponds to an appropriate signature provided to PMIC 40 to communicate appropriate information to PMIC 40 without requiring communication with communications interfaces 34 and 44, so that they may remain powered down. In one embodiment, each signature is provided as a bit sequence of three bits on PMIC_STBY_MODE_B signal line. In one embodiment, each bit of the bit sequence can either be a high bit period (T1) or a low bit period (T0). For example, T1 refers to a duration of time the signal line is held high to indicate a "1" bit, and TO refers to a duration of time the signal line is held low to indicate a "0" bit. In the illustrated examples, T0=T1, but alternatively, T0 and T1 can have different periods (i.e. different durations of time). In the example of FIG. 4, a "111" bit-sequence (represented in set 94) corresponds to a full wakeup (e.g. a full boot from a lower power mode to LIMP mode), a "110" bit sequence (represented in set 96) corresponds to a fast wakeup (e.g. a transition from a lower power mode to HOUSEKEEPING mode), and a "100" bit sequence (represented in set 98) corresponds to a stop-to-sleep trigger (e.g. a transition from STOP mode directly to SLEEP mode without requiring any intermediate state or power mode). Note that in alternate embodiments, different length bit sequences can be defined, as needed, and is not limited to a three bit sequence. Also, note that the bit sequences are generated and sent from processor 12 to PMIC 40 using an existing signal line while processor 12 remains in a low power mode in which only always ON island 26 is powered (e.g. in STOP or SLEEP mode) and while PMIC 40 is in standby mode.

In the case of a wakeup (such as in sets 94 and 96), the processor supplies 43 to at least islands 24 and 20 are ramped up for normal operation (in LIMP or HOUSEKEEPING mode), in which completion is indicated by PMIC_VD- D_OK going high. In this case, once in LIMP or HOUSE-KEEPING mode, PMIC_STBY_MODE_B remains high (negated), which allows the next falling edge (assertion) of PMIC_STBY_MODE_B to indicate a request to enter STOP or SLEEP modes (in accordance with normal operation). For example, in set 94, PMIC_STBY_MODE_B being low (asserted) indicates PMIC 40 is in standby mode (and processor 12 is in SLEEP or STOP mode). Upon indication of a full wakeup received in always ON island 26 of processor 12, the appropriate signature (bit sequence of "111") is sent to PMIC 40 using the PMIC_STBY_MODE_B line. In response, PMIC 40 ramps up the necessary power supplies for LIMP mode, asserting PMIC_VDD_OK high when the supplies complete powering up. State machine 80 enters LIMP mode (state 86), in which PMIC_STBY_MODE_B remains high (negated) since PMIC 40 is no longer in standby mode. POR_B also remains high (negated) to indicate processor 12 is not in a reset state. In set 96, PMIC_STBY_MODE_B begins low (asserted) to indicate PMIC 40 is in standby mode. Upon indication of a fast wakeup received in always ON island 26, the appropriate signature (bit sequence of "110") is sent to PMIC 40 using the PMIC_STBY_MODE_B line. In response, PMIC ramps up the necessary power supplies for HOUSEKEEPING mode, asserting PMIC_VDD_OK when complete. State machine 80 transitions to HOUSEKEEPING mode (state 88) in which PMIC_STBY_MODE_B remains high (negated) since PMIC 40 is no longer in standby mode.

However, in the example of set 98, although PMIC_STBY_MODE_B begins low to indicate PMIC 40 is in standby mode (with state machine 80 in STOP mode), upon a stop-to-sleep trigger in always ON island 26 of processor 12, PMIC 40 does not ramp up the processor supplies for any of the other islands of processor 12 (including islands 24, 20, and 16). In this case, PMIC_VDD_OK remains low (negated). After the "100" bit sequence completes, state machine 80 transitions from STOP mode to SLEEP mode, in which PMIC_STBY_MODE_B returns to low (asserted) since processor 12 remains in a low power mode (e.g. SLEEP mode) and PMIC 40 remains in standby mode. In this manner, a STOP mode to SLEEP mode transition is performed without entering normal operation (e.g. without entering HOUSEKEEPING mode or a higher power mode) and without PMIC 40 leaving standby mode. This also allows the next rising edge on PMIC_STBY_MODE_B to indicate the start of a wake-up or trigger request, and indicates to PMIC 40 that a bit sequence is being sent for decoding. In the examples of sets 96 and 98, note that POR_B also remains high due to the lack of a resetstate.

In one embodiment, the periods of T1 and TO are long enough to allow a low-frequency clock in always ON domain 42 of PMIC 40 to oversample the bits of the bit sequence with minimal risk of error. Also, the low-frequency clock does not require large power requirements for PMIC 40 while in standby mode. Note also that the protocol using the bit sequence signatures can be expanded to any number of wakeup types and trigger types by increasing the number of bits used for coding the sequences (for supplying the bit sequences). In one embodiment, if PMIC 40 detects an illegal signature or bit sequence, it can interpret this as a protocol error and initiate a POR. Also, in one embodiment, if POR_B goes low (i.e. is asserted) at any time in the window between PMIC_STBY_MODE_B going low and PMIC_VDD_OK going high, PMIC 40 can interpret this as an aborted protocol and also initiate a POR.

In the embodiments described above, the use of the handshake signals to provide signatures implements a digital protocol through the use of pulses to communicate bit sequences. In alternate embodiments, other signaling methods may be used. For example, a signaling mechanism using voltage levels in place of or in addition to pulses to provide signatures may be used.

Figure 5:
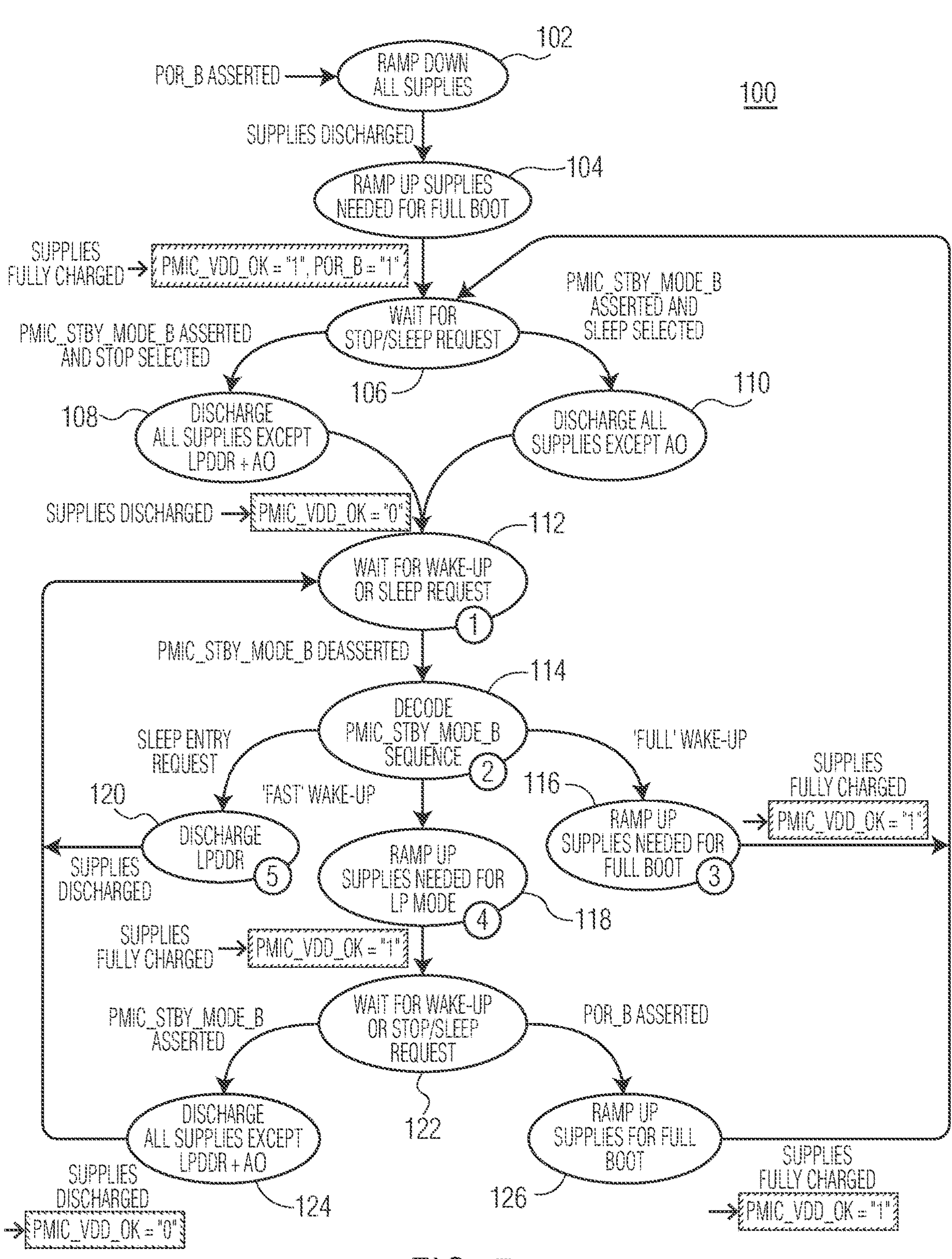
FIG. 5 illustrates, in flow diagram form, a control sequence executed by the PMIC of FIG. 1, in accordance with one embodiment of the present invention.

The signatures provided to PMIC 40 via PMIC_STBY_MODE_B are interpreted by PMIC 40 so that PMIC 40 may correctly control the processor power supplies (power supplies 43) to correctly transition power states. Note that the signatures are sent to PMIC 40 and interpreted by PMIC 40 while PMIC 40 remains in standby mode, without requiring transition to a higher power mode since the use of communications interfaces 34 and 44 is not required. FIG. 5 illustrates, in flow diagram form, a control sequence 100 which may be executed by PMIC 40. The illustrated embodiment of control sequence 100 will be described with respect to the protocol examples provided in FIG. 4.

Initially, in block 102 of FIG. 5, in response to assertion of a reset (e.g. assertion of RESET_OUT_B to a logic zero) all power supplies are ramped down by PMIC 40. (Note that reset generation circuit 74 may assert RESET_OUT_B in response to assertion of POR_B which resets processor 12.) After the supplies are discharged, at some point during reset the supplies are ramped up for a full boot of system 10 (block 104). Once the supplies are fully charged (fully powered up) and POR_B is released (negated), PMIC 40 enters normal operation (e.g. enters LIMP mode) in which PMIC 40 is waiting (block 106) to receive a request to enter STOP or SLEEP modes. In this case, since system 10 is in normal operation and not in a low power mode (in which PMIC 40 and at least island 24 is fully powered), the control and handshake signals for transitioning to power modes operate according to the normal bus and communications interface protocols. If the low power mode request signal PMIC_STBY_MODE_B is asserted and the STOP mode is selected, method 100 proceeds to block 108 in which all the power supplies except those for the low power dual data rate memory (LPDDR) and the always ON domains are discharged (powered down). On the other hand, if the low power mode request signal PMIC_STBY_MODE_B is asserted and the SLEEP mode is selected, method 100 proceeds to block 1110 in which all the power supplies except the always ON domains are discharged (powered down). Once the appropriate domains (e.g. islands) are powered down, PMIC 40 negates PMIC_VDD_OK to zero and method 100 proceeds to block 112, in which PMIC 40 is in standby mode and processor 12 is in a low power mode (STOP or SLEEP mode).

At block 112, PMIC 40 waits for a wake-up request or a sleep request. A rising edge on PMIC_STBY_MODE_B received during STOP or SLEEP mode triggers PMIC 40 to decode the bit sequence on PMIC_STBY_MODE_B at its input (pin 48). Note that this was also described above in reference to the set of waveforms 94, 96, and 98 of FIG. 4 in which the bit sequences on PMIC_STBY_MODE_B were decoded after negation (a rising edge) of PMIC_STBY_MODE_B when in STOP or SLEEP mode. Therefore, upon negation of PMIC_STBY_MODE_B, method 100 proceeds to block 114 in which the bit sequence on PMIC_STBY_MODE_B is interpreted. In the case of the bit sequence being "111," method 100 proceeds to block 116, which corresponds to the example set 94 of FIG. 4. In the case of the bit sequence being "110," method 100 proceeds to block 118, which corresponds to the example set 96 of FIG. 4. In the case of the bit sequence being "100," method 100 proceeds to block 120, which corresponds to the example set 98 of FIG. 4.

If, at block 114, the decode of the bit sequence results in "111," a full wakeup is indicated and, at block 116, the power supplies needed for the full boot are powered up by PMIC 40. When the supplies are powered up, PMIC 40 asserts PMIC_VDD_OK (to a logic one) to let processor 12 know that it can now perform a full boot. Afterwards, method 100 returns to block 106 to wait for the next falling edge of PMIC_STBY_MODE_B (or a falling edge of POR_B which corresponds to block 102).

If, at block 114, the decode of the bit sequence results in "110," a fast wakeup is indicated and, at block 118, the power supplies needed for the HOUSEKEEPING mode (e.g. for island 24) are powered up by PMIC 40. When the supplies are powered up, PMIC 40 asserts PMIC_VDD_OK (to a logic one) to let processor 12 know that it can now enter HOUSEKEEPING mode. Afterwards, method 100 continues to block 122 to wait for a wakeup or a request to enter STOP or SLEEP mode. If PMIC_STBY_MODE_B is asserted (to a logic zero), a request to STOP or SLEEP is indicated in which, at block 124, the power supplies not needed for the selected low power mode are discharged (powered down). When discharged, PMIC 40 negates PMIC_VDD_OK to zero, returning to block 106. If, at block 122, RESET_OUT_B is asserted (to a logic zero), a wakeup is indicated and the power supplies needed for the full boot (e.g. for islands 16, 20, and 24) are ramped up. When fully powered up, PMIC 40 asserts PMIC_VDD_OK to a logic one. Method 100 then returns to block 106. Therefore, at block 122, PMIC 40 waits for a next falling edge of PMIC_STBY_MODE_B or a next falling edge of RESET_OUT_B. Note that reset generation circuit 74 may assert RESET_OUT_B in response to assertion of POR_B (to a logic zero) which resets processor 12, resulting in a full power up.

If, at block 114, the decode of the bit sequence results in "100," a stop-to-sleep trigger is indicated (which operates as a request to enter SLEEP mode). In block 120, in response to the request to enter SLEEP mode, all power supplies (including the power supply for the LPDDR), except those for the always ON domains are discharged. Once the appropriate domains (e.g. islands) are powered down, method 100 returns to block 112 (and PMIC_VDD_OK remains negated at zero.

Therefore, by now it can be understood how a processor can transition between low power modes while remaining in a low power mode and without the corresponding PMIC exiting standby mode, resulting in reduced power consumption. The processor is capable of operating in various different power modes and is divided into multiple power domains, including an always ON domain and a selectively powered domain. The selectively powered domain includes a communications interface and a processor core, but the selectively powered domain is not available (is powered down) in the low power modes. The PMIC also includes an always ON domain and a selectively powered domain, in which the selectively powered domain includes a corresponding communications interface coupled to communicate with the communications interface of the processor over a bus. During the low power modes, the PMIC is placed into standby mode in which the selectively powered domain may also be powered down.

When the selectively powered domains are powered, the processor communicates with the PMIC using the communications interfaces, as controlled by the processor core, over the bus in accordance with a bus protocol, to control power mode transitions of the processor. In addition to the bus, the always ON domains may further control handshake signals between the processor and the PMIC which are used in conjunction with the communications interface, to control power mode transitions. In one embodiment, while the processor is in a low power mode and the PMIC is therefore in standby mode, the communications interfaces and the bus are not available, but the existing handshake signals can instead be used to communicate signatures, as needed, to control transfers between low power modes without powering up any of the selectively powered domains. That is, the existing handshake signals can be used to communicate without needing the full communication protocol required by communications via the bus. In one embodiment, a signature is communicated as a bit sequence by pulsing one of the existing handshake signals, in which circuitry within the always ON domain of the PMIC can interpret and decode the signature in order to control the power mode transitions between the low power modes. By repurposing existing signals in this manner, power consumption is reduced by not requiring powering up out of the low power modes when certain power mode transitions are needed.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by the description, a bar over the signal name, or "_B" following the name. In the case of a negative logic signal, the signal is active low where the logically true state corresponds to a logic level low (e.g. a logic level zero). In the case of a positive logic signal, the signal is active high where the logically true state corresponds to a logic level high (e.g. a logic level one). Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of system 102 are circuitry located within a same device. In one example, system 102 may include any number of separate integrated circuits or separate devices interconnected with each other. For example, PMIC 104 and processor 106 may be separate integrated circuits or a memory of system 102 may be located on a same integrated circuit as processor 106 or on a separate integrated circuit or located within another peripheral discretely separate from other elements of system 102.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments May include multiple instances of a particular operation, and the order of operations may be altered in various other embodiments.

All or some of the software or instructions described herein may be received elements of system 102, for example, from computer readable media such as memory or other media on other computer systems. Such computer readable media may be permanently, removably or remotely coupled to an information processing system such as system 102. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. For example, the format of the initial or raw wakeup request and the actual or qualified wakeup request may differ. For example, different pins or combination of pins or different input/outputs or different signaling may be used to provide this information. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention. Note that any of the aspects described below may apply to any of the embodiments described below.

In one embodiment, a processing system includes processing circuitry capable of operating in a plurality of power modes, including multiple low power modes. The processing circuitry includes a selectively powered domain having a communications interface configured to communicate with power management circuitry via a bus in accordance with a bus protocol, and a processing core configured to control the communications interface, wherein the selectively powered domain is not powered when the processing circuitry is operating in any of the multiple low power modes, and an always on power domain having a set of pins configured to communicate a set of handshake signals with the power management circuitry and a power management sequencer configured to control power mode transitions of the processing circuitry. When the selectively powered domain is powered, the processing circuitry is configured to communicate power mode transitions with the power management circuitry using the set of handshake signals and the communications interface in accordance with the bus protocol, and when the processing circuitry is operating in one of the multiple low power modes such that the communications interface and the processing core are not powered, the power management sequence is configured to provide a signature on the set of handshake signals to control power mode transitions from the one of the multiple low power modes.

In one aspect of the above embodiment, the signature is provided on a handshake signal of the plurality of handshake signals and is representative of an encoded bit sequence. In a further aspect, the signature is provided as a series of pulses which reflects the encoded bit sequence. In another further aspect, the handshake signal is characterized as a standby mode request signal, and wherein when the selectively powered domain is powered, assertion of the standby mode request signal indicates to the power management circuitry a request to transition from a non-low power mode of the plurality of power modes to one of the multiple low power modes. In yet a further aspect, when the processing system is operating in any low power mode of the multiple low power modes, only the always on power domain of the processing circuitry is powered, in which no other power domain of the processing circuitry is powered, and when the processing circuitry is operating in any non-low power mode of the plurality of power modes, one or more additional power domains of the processing circuitry is powered. In yet an even further aspect, when the processing system is operating in one of the multiple low power modes, the always on domain is configured to deassert the standby request signal to indicate provision of the signature.

In another aspect, the power management sequencer is configured to provide a first value as the signature in which the first value requests the power management circuitry to power up the one or more additional power domains in order to transition to a higher power mode than the multiple low power modes, and provide a second value as the signature in which the second value requests the power management circuitry to transfer to another low power mode of the multiple low power modes without powering up any additional power domains to transfer to the another low power domain.

In yet another aspect, when the processing system is operating in one of the low power modes, the always on domain is configured to deassert the standby request signal in response to a wakeup event or a low power mode transition trigger. In a further aspect, the low power mode transition trigger corresponds to a timer reaching a threshold count value, wherein the timer is configured to initiate counting upon entering a higher power mode of the multiple low power modes.

In another embodiment, a processing system includes processing circuitry capable of operating in a plurality of power modes, including multiple low power modes. The processing circuitry includes a selectively powered domain having a communications interface configured to communicate with power management circuitry via a bus in accordance with a bus protocol, and a processing core configured to control the communications interface, wherein the selectively powered domain is not powered when the processing circuitry is operating in any of the multiple low power modes, and an always on power domain having a set of pins configured to communicate a set of handshake signals with the power management circuitry and a power management sequencer configured to control power mode transitions of the processing circuitry. When the processing circuitry is operating in one of the multiple low power modes such that the communications interface and the processing core are not powered, the power management sequencer is configured to generate a signature on the set of handshake signals to control power mode transitions from the one of the multiple low powermodes.

In one aspect of the another embodiment, when the selectively powered domain is powered, the processing circuitry is configured to communicate power mode transitions with the power management circuitry using the set of handshake signals and the communications interface in accordance with the bus protocol. In a further aspect, when the processing system is operating in the one of the low power modes, the power management circuitry is configured to generate the signature in response to a wakeup event or a trigger, wherein the wakeup event corresponds to one of an external or internal wakeup event and the trigger corresponds to a timer, initiated upon entry into the one of the low power modes, reaching a predetermined count value. In yet a further aspect, when the processing system is operating in any of the low power modes of the multiple low power modes, only the always on power domain of the processing circuitry is powered, in which no other power domain of the processing circuitry is powered. In yet an even further aspect, the power management sequencer is configured to generate a first value as the signature when generated in response to the wakeup event, in which the first value requests the power management circuitry to power up one or more additional power domains in order to transition to a higher power mode than the multiple low power modes, and the power management sequence is configured to generate a second value as the signature when generated in response to a trigger, in which the second value requests the power management circuitry to not power up any other power domain of the processing system for transitioning to another low power domain of the multiple low power modes. In yet an even further aspect, when the processing system is operating in one of the low power modes, the processing system is configured to indicate that the generated signature is being provided on a selected handshake signal of the set of handshake signals by providing a predetermined transition on the selected handshake signal prior to providing the signature.

In yet another embodiment, power management circuitry includes a set of power supplies configured to provide power to a processor, a selectively powered domain having a communications interface configured to communicate with the processor via a bus in accordance with a bus protocol, wherein the selectively powered domain is not powered when the power management circuitry is operating in standby mode, and an always on power domain having a set of pins configured to communicate a set of handshake signals with the processor. When the selectively powered domain is powered, the power management circuitry is configured to communicate with the processor to control power mode transitions using the set of handshake signals and the communications interface in accordance with the bus protocol, and when the power management circuitry is in standby mode, in which the communications interface is not powered, the always on domain is configured to, in response to detecting a predetermined transition on a predetermined handshake signal of the set of handshake signals, receive and decode a signature on the set of handshake signals to control power mode transitions while remaining in standby mode.

In one aspect of the yet another embodiment, the signature is received on a first handshake signal and is representative of an encoded bit sequence. In a further aspect, the first handshake signal is a same signal as the predetermined handshake signal and is characterized as a standby mode request signal received from the processor. In another further aspect, when the received signature has a first value, the power management circuitry is configured to power up one or more power supplies to provide power to the processor, assert a second handshake signal when the one or more power supplies are powered and ready for the processor to wakeup, and exit the standby mode, and when the received signature has a second value, the power management circuitry is configured to transition the power supplies from providing power in accordance with a first low power mode to providing power in accordance with a second low power mode, without exiting standby mode. In yet a further aspect, the second low power mode is a lower power mode than the first low power mode, and when the received signature has the second value, the second handshake signal remains negated.

We claim:

1. A processing system comprising:

processing circuitry capable of operating in a plurality of power modes, including multiple low power modes, the processing circuitry comprising:

a selectively powered domain having a communications interface configured to communicate with power management circuitry via a bus in accordance with a bus protocol, and a processing core configured to control the communications interface, wherein the selectively powered domain is not powered when the processing circuitry is operating in any of the multiple low power modes;

an always on power domain having a set of pins configured to communicate a set of handshake signals with the power management circuitry and a power management sequencer configured to control power mode transitions of the processing circuitry, wherein:

when the selectively powered domain is powered, the processing circuitry is configured to communicate power mode transitions with the power management circuitry using the set of handshake signals and the communications interface in accordance with the bus protocol; and when the processing circuitry is operating in one of the multiple low power modes such that the communications interface and the processing core are not powered, the power management sequencer is configured to provide a signature on a handshake signal of the set of handshake signals to control power mode transitions from the one of the multiple low power modes, wherein the signature is representative of an encoded bit sequence.

2. The processing system of claim 1, wherein the power management sequencer is configured to:

provide a first value as the signature in which the first value requests the power management circuitry to power up the one or more additional power domains in order to transition to a higher power mode than the multiple low power modes, and provide a second value as the signature in which the second value requests the power management circuitry to transfer to another low power mode of the multiple low power modes without powering up any additional power domains to transfer to the another low power domain.

3. The processing system of claim 1, wherein the signature is provided as a series of pulses which reflects the encoded bit sequence.

4. The processing system of claim 1, wherein the handshake signal is characterized as a standby mode request signal, and wherein when the selectively powered domain is powered, assertion of the standby mode request signal indicates to the power management circuitry a request to transition from a non-low power mode of the plurality of power modes to one of the multiple low power modes.

5. The processing system of claim 4, wherein:

when the processing system is operating in any low power mode of the multiple low power modes, only the always on power domain of the processing circuitry is powered, in which no other power domain of the processing circuitry is powered, and when the processing circuitry is operating in any non-low power mode of the plurality of power modes, one or more additional power domains of the processing circuitry is powered.

6. The processing system of claim 5, wherein when the processing system is operating in one of the multiple low power modes, the always on domain is configured to deassert the standby request signal to indicate provision of the signature.

7. The processing system of claim 6, wherein the power management sequencer is configured to:

provide a first value as the signature in which the first value requests the power management circuitry to power up the one or more additional power domains in order to transition to a higher power mode than the multiple low power modes, and provide a second value as the signature in which the second value requests the power management circuitry to transfer to another low power mode of the multiple low power modes without powering up any additional power domains to transfer to the another low power domain.

8. The processing system of claim 6, wherein when the processing system is operating in one of the low power modes, the always on domain is configured to deassert the standby request signal in response to a wakeup event or a low power mode transition trigger.

9. The processing system of claim 8, wherein the low power mode transition trigger corresponds to a timer reaching a threshold count value, wherein the timer is configured to initiate counting upon entering a higher power mode of the multiple low power modes.

10. A processing system comprising:

processing circuitry capable of operating in a plurality of power modes, including multiple low power modes, the processing circuitry comprising:

a selectively powered domain having a communications interface configured to communicate with power management circuitry via a bus in accordance with a bus protocol, and a processing core configured to control the communications interface, wherein the selectively powered domain is not powered when the processing circuitry is operating in any of the multiple low power modes;

an always on power domain having a set of pins configured to communicate a set of handshake signals with the power management circuitry and a power management sequencer configured to control power mode transitions of the processing circuitry, wherein:

when the processing circuitry is operating in one of the multiple low power modes such that the communications interface and the processing core are not powered, the power management sequencer is configured to generate a signature on a handshake signal of the set of handshake signals to control power mode transitions from the one of the multiple low power modes, wherein the signature is representative of an encoded bit sequence;

wherein the signature is generated in response to a wakeup event or a trigger, wherein the wakeup event corresponds to one of an external or internal wakeup event and the trigger corresponds to a timer, initiated upon entry into the one of the low power modes, reaching a predetermined count value, wherein the power management sequencer is configured to generate a first value as the signature when generated in response to the wakeup event, in which the first value requests the power management circuitry to power up one or more additional power domains in order to transition to a higher power mode than the multiple low power modes, and wherein the power management sequencer is configured to generate a second value as the signature when generated in response to a trigger, in which the second value requests the power management circuitry to not power up any other power domain of the processing system for transitioning to another low power domain of the multiple low power modes.

11. The processing system of claim 10, wherein when the selectively powered domain is powered, the processing circuitry is configured to communicate power mode transitions with the power management circuitry using the set of handshake signals and the communications interface in accordance with the bus protocol.

12. The processing system of claim 10, wherein when the processing system is operating in any of the low power modes of the multiple low power modes, only the always on power domain of the processing circuitry is powered, in which no other power domain of the processing circuitry is powered.

13. The processing system of claim 10, wherein when the processing system is operating in one of the low power modes, the processing system is configured to indicate that the generated signature is being provided on a selected handshake signal of the set of handshake signals by providing a predetermined transition on the selected handshake signal prior to providing the signature.

14. Power management circuitry comprising:

a set of power supplies configured to provide power to a processor;

a selectively powered domain having a communications interface configured to communicate with the processor via a bus in accordance with a bus protocol, wherein the selectively powered domain is not powered when the power management circuitry is operating in standby mode;

an always on power domain having a set of pins configured to communicate a set of handshake signals with the processor, wherein:

when the selectively powered domain is powered, the power management circuitry is configured to communicate with the processor to control power mode transitions using the set of handshake signals and the communications interface in accordance with the bus protocol; and when the power management circuitry is in standby mode, in which the communications interface is not powered, the always on domain is configured to, in response to detecting a predetermined transition on a first handshake signal of the set of handshake signals, receive and decode a signature on a second handshake signal of the set of handshake signals to control power mode transitions while remaining in standby mode, wherein the signature is representative of an encoded bit sequence.

15. The power management circuitry of claim 14, wherein the first handshake signal is a same signal as the second handshake signal and is characterized as a standby mode request signal received from the processor.

16. The power management circuitry of claim 14, wherein:

when the received signature has a first value, the power management circuitry is configured to power up one or more power supplies to provide power to the processor, assert a third handshake signal when the one or more power supplies are powered and ready for the processor to wakeup, and exit the standby mode; and when the received signature has a second value, the power management circuitry is configured to transition the power supplies from providing power in accordance with a first low power mode to providing power in accordance with a second low power mode, without exiting standby mode.

17. The power management circuitry of claim 16, wherein the second low power mode is a lower power mode than the first low power mode, and when the received signature has the second value, the third handshake signal remains negated.

* * * * *